United States Patent
Sahita et al.

(10) Patent No.: US 8,381,288 B2
(45) Date of Patent: Feb. 19, 2013

(54) RESTRICTED COMPONENT ACCESS TO APPLICATION MEMORY

(75) Inventors: Ravi Sahita, Beaverton, OR (US); Uday R. Savagaonkar, Beaverton, OR (US); Divya Naidu Kolar Sunder, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 663 days.

(21) Appl. No.: 12/242,716

(22) Filed: Sep. 30, 2008

(65) Prior Publication Data
US 2010/0082926 A1    Apr. 1, 2010

(51) Int. Cl.
*G06F 21/00* (2006.01)
(52) U.S. Cl. ........... 726/22; 713/164; 711/154; 711/163
(58) Field of Classification Search ............... 726/22, 726/23–24; 705/51–54; 713/189–194, 150–181; 717/178; 711/163, 154
See application file for complete search history.

(56) References Cited

U.S. PATENT DOCUMENTS

| | | | |
|---|---|---|---|
| 5,890,189 A * | 3/1999 | Nozue et al. | 711/100 |
| 6,854,039 B1 * | 2/2005 | Strongin et al. | 711/163 |
| 7,337,291 B2 * | 2/2008 | Abadi et al. | 711/163 |
| 8,099,574 B2 * | 1/2012 | Savagaonkar et al. | 711/163 |
| 2004/0034794 A1 * | 2/2004 | Mayer et al. | 713/200 |
| 2004/0153346 A1 * | 8/2004 | Grundel et al. | 705/4 |
| 2005/0027988 A1 * | 2/2005 | Bodrov | 713/176 |
| 2006/0026569 A1 * | 2/2006 | Oerting et al. | 717/126 |
| 2007/0005992 A1 * | 1/2007 | Schluessler et al. | 713/193 |
| 2007/0088890 A1 * | 4/2007 | Wieland et al. | 710/269 |
| 2007/0156999 A1 * | 7/2007 | Durham et al. | 711/170 |

OTHER PUBLICATIONS

Chang et al, User-level Resource-constrained sandboxing, Aug. 2000.*
Ram kumar et al, Software-Based Memory Protection in sensor nodes, Apr. 2007.*

* cited by examiner

*Primary Examiner* — Jung Kim
*Assistant Examiner* — Shan Elahi
(74) *Attorney, Agent, or Firm* — Schwabe, Williamson & Wyatt, P.C.

(57) ABSTRACT

Embodiments of the present disclosure provide methods, systems, and articles for restricting access to memory of an application by a component of the application, for example, pluggable code modules. Other embodiments may also be described and claimed.

20 Claims, 3 Drawing Sheets

RESTRICTED COMPONENT ACCESS TO APPLICATION MEMORY

TECHNICAL FIELD

Embodiments of the present invention relate to the fields of computing security, and, more specifically, to securing computing by restricting the access of components within an execution environment to identified memory regions.

BACKGROUND

Worms, viruses, and other forms of malware are increasingly abundant in today's digital environment. They are becoming increasingly stealthy and modular with attacks being delivered silently via applications such as browsers and through the use of drive-by downloads, where a user is directed to an infected web server hosting malicious code. Such malicious software, firmware, etc., when included into a computer system, can bring about harmful results. Worms and viruses are now capable of modifying critical kernel and/or user-space components of a computer system while the components are loaded into a memory. The effects can decrease efficiency of a system, destroy information, leak private information, infect a system, and otherwise make a computer system unstable.

While sandboxing schemes are aimed at providing protection, current sandboxing schemes cannot protect the operating system (OS), applications, or trusted drivers in the OS from other drivers or other privileged services running at the same privilege level. For example, in the ubiquitous Window computing environment, a kernel level or ring-0 program can be monitored, altered, or controlled by various other kernel level or ring-0 programs. Consequently, once malicious code is loaded, it may have access and the ability to modify or alter other critical components regardless of their ring levels.

BRIEF DESCRIPTION OF THE DRAWINGS

Embodiments of the present disclosure will be readily understood by the following detailed description in conjunction with the accompanying drawings. Embodiments of the disclosure are illustrated by way of example and not by way of limitation in the figures of the accompanying drawings.

DETAILED DESCRIPTION OF EMBODIMENTS

Figure 1:
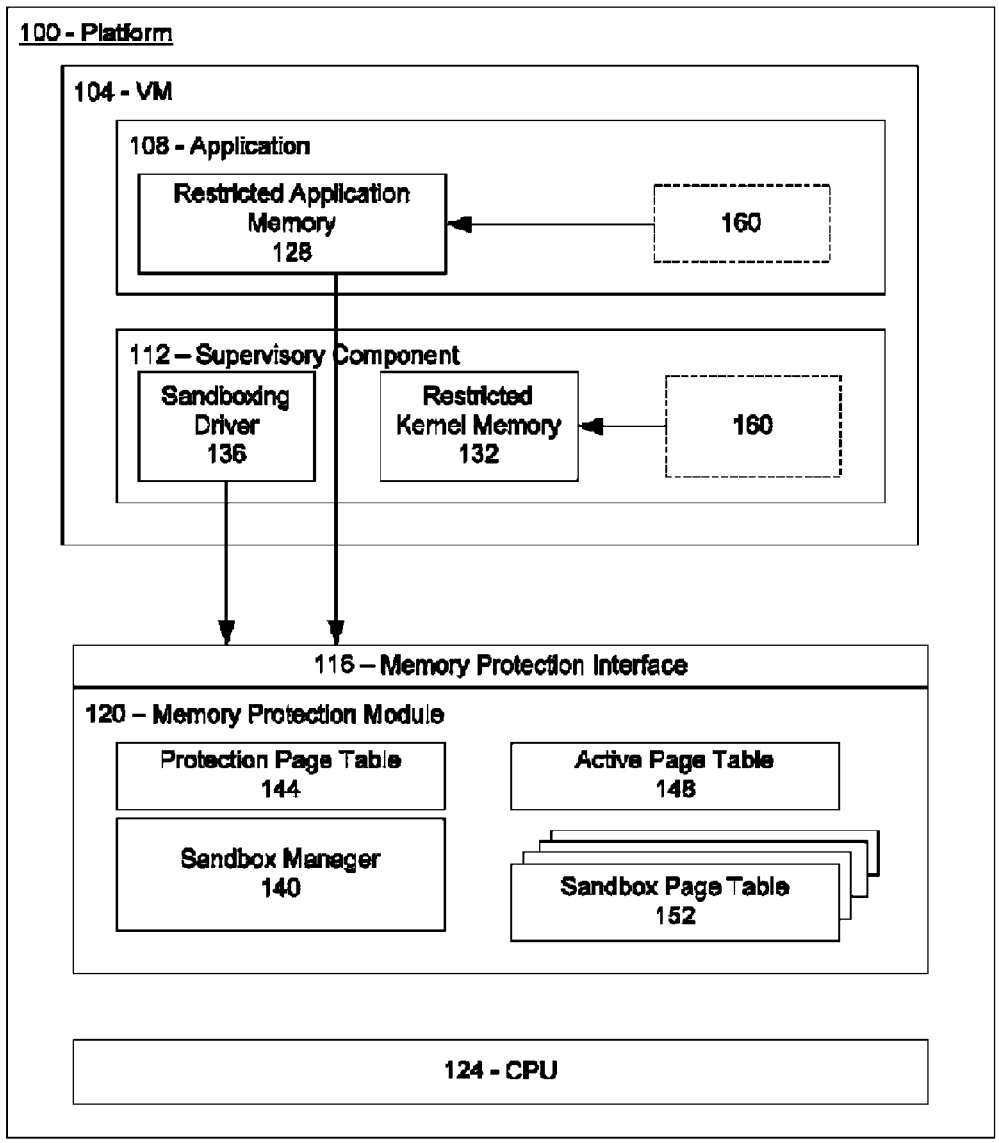
FIG. 1 illustrates a platform configured to enable restricting component access to specified memory areas in accordance with various embodiments.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present disclosure.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In various embodiments of the present disclosure, methods, apparatuses, articles, and systems for preventing or reducing the likelihood of attacks from software components, such as pluggable code modules, that are allowed to be loaded into the OS kernel or application address space, are disclosed. In various embodiments, pluggable code modules may include programs and/or components executing in a memory region allocated to the application. The components, in various embodiments, may be prevented from accessing memory previously restricted by the application itself, or in other embodiments, memory identified as restricted by other components, for example a sandboxing driver. In exemplary embodiments of the present disclosure, a computing system may be endowed with one or more components of the disclosure and may be employed to perform one or more methods as disclosed herein.

Embodiments of the present disclosure provide a hardware enforced software sandboxing capability for code written in a native instruction set. In various embodiments, this may allow software application vendors to develop natively extensible applications without the risk of being subverted by a malicious plug-in (e.g. pluggable code module). In various embodiments, the disclosure teaches a flexible approach that allows different restriction views for the same service and/or various drivers executing within the same memory region. In various embodiments, a programmer may introduce sub-levels within the computer infrastructure that are enforced by the CPU via hardware support. In various embodiments, this may allow software executing in ring-0 to be protected from other high-privileged attacks by unknown components similarly executing in ring-0.

FIG. 1 illustrates a sandboxing capable platform 100. In various embodiments, sandboxing may refer to isolating or restricting various software components from accessing restricted memory regions associated with an application and/or computer system. In various embodiments, the platform 100 may have one or more execution environments such as a "virtual machine" (VM) 104, which may be the domain of an executing operating system and one or more applications 108. In various embodiments, application 108 may include components, e.g., pluggable code modules including web browser helper objects (BHO's), active-x plug-ins, or other custom plug-ins, for example, plug-ins associated with office or e-mail applications. Platform 100 may also include a supervisory level component 112 such as an operating system (OS) kernel component. The kernel component may include a driver component 136 such as a sandboxing driver, to be described in more detail herein. The platform 100 may also include a memory protection module 120 which communicates with various components of the VM 104 via a memory protection interface 116. In various embodiments, the memory protection module may include a manager component such as a sandbox manager 140, sandboxed page tables 152, active page tables 148 and protection page tables 144. In various embodiments, platform 100 may also include a CPU 124 and other hardware known in the art, but not illustrated, for example, various types of memory including but not limited to read only memory and random access memory.

As used herein, the term "component" is intended to refer to programming logic and associated data that may be employed to obtain a desired outcome. The term component may be synonymous with module, routine, or a collection of software instructions, possibly having entry and exit points, written in a programming language such as, but not limited to, C, C++, or Intel Architecture 32 bit (IA-32) native instructions. The term may also refer to programming logic that may be embodied in hardware or firmware.

A software component may be compiled and linked into an executable program, or installed in a dynamic link library (DLL), or may be written in an interpretive language such as BASIC. It will be appreciated that software components may be callable from other components or from themselves, and/or may be invoked in response to detected events or interrupts. Software instructions may be provided in a computer readable medium, which when executed by a computer, may result in the computer performing operations, executions, or implementations described in conjunction with components of embodiments of the present invention. A computer readable medium may include, e.g., an electrically erasable programmable read-only memory (EEPROM), or other recordable medium, e.g., read-only memory (ROM), random access memory (RAM), magnetic disk storage, optical disk storage, etc. It will be further appreciated that hardware elements may be comprised of connected logic units, such as programmable gate arrays or processors, which may operate various components as described herein. Furthermore, although only a given number of discrete software/hardware elements may be illustrated and/or described, such elements may nonetheless be represented by additional elements or fewer elements without departing from the spirit and scope of embodiments of the disclosure.

With reference to FIG. 1, a supervisory component 112, such as an OS Kernel component may include a driver component 136. In various embodiments, the driver component 136 may be a sandbox driver 136. The sandbox driver 136 may be introduced as a driver into the OS, or alternatively, as a library into the application space of an application 108. The sandbox driver 136, in various embodiments, may be responsible for interacting with a memory protection module 120 via a memory protection interface 116 to inform the memory protection module 120 of new programs or pluggable code that is loaded into an application space. In various embodiments, the sandbox driver 136 may inform the memory protection module 120 of applications that are to be protected from other components such as plug-ins. In various embodiments, the sandbox driver 136 may also register components that are to be restricted from various memory regions (e.g. sandboxed) with the memory protection module 120. In various embodiments, to register an application for protection or a component for sandboxing, the sandbox driver 136 or driver component may specify a name of the application 108 or component that is executing and the address space context (e.g. control register, such as CR3 for Intel Architecture Processors) for the application or program. In embodiments utilizing more than one VM, the sandbox driver 136 or other driver component may also register the current guest for the applications to be tracked.

In various embodiments, the driver component 136 may be protected from other components by isolating its execution environment from the rest of the OS. Consequently, the OS and other components may not be able to access the driver component 136, but the driver component 136 may communicate with the OS to facilitate registration of applications with the virtual machine monitor (VMM). In various embodiments, protecting the sandbox driver 136 may result in the creation of protection page table 144. In other embodiments, other manners of protecting the sandbox driver 136 or driver components are contemplated In various embodiments, the memory protection module 120 may include a management module 140 such as a sandbox manager 140. In various embodiments, the management module 140 may create and/or manage various page tables including the protection page table 144, active page table 148, and sandbox page table 152. The management module 140 may manage the execution flow between the protection page tables 144 and the sandbox page tables 152 to control access to various components. In various embodiments, the management module 140 may create the sandbox page tables 152 in response to a registration event, for example a registration request, received from the driver component 136. In various embodiments, the management module 140 may run in the context of the VMM and may be configured to ensure that a sandboxed program cannot access the restricted regions of memory in its address space view of memory.

In various embodiments, application 108 and/or the OS may have restricted memory. In various embodiments, restricted memory may include restricted application memory 128 and restricted kernel memory 132. In various embodiments, for the supervisory component 112 (e.g., the OS Kernel), the restricted memory 132 may be important kernel data structures, or system/kernel call tables. For an application 108, restricted memory 128 may include a heap associated with the application or other private data structures, for example encryption keys. In various embodiments, these memory regions are to be protected from unknown components such as sandboxed programs, plug-ins, sandboxed drivers, sandboxed DLL, etc 160.

In various embodiments, the restricted memory 132 and 128 are to be protected from being altered, modified, copied, or otherwise infiltrated by unknown third party components, sandboxed programs, etc. Such components, in various embodiments, may be unknown kernel components or programs which include unknown third party code. The unknown third party code may have been included in the control flow of the application unintentionally or intentionally by malicious programs. In various embodiments, such unknown components may be referred to as sandboxed programs or sandboxed components because access control to restricted regions may be enforced on these program's memory regions. For example, pluggable code 160 executing in an address space may be restricted from accessing memory regions associated with the application 108 such as restricted application memory 128 and/or restricted memory associated with the supervisory component 112 such as restricted kernel memory 132.

Still with reference to FIG. 1, an operation of a sandboxing capable system may be described in accordance with at least one embodiment. First, in various embodiments, a driver component 136 may be isolated from the execution environment of the OS. In various embodiments, this may include measuring and protecting the driver component 136 to ensure the validity and security of the driver component 136. In various embodiments, integrity measurement of the driver component 136 may include verification of integrity information included in a portable executable (PE) file of the driver. The integrity information may have been previously included in the PE file of the driver component 136 prior to its loading. Other forms of verification and/or measurement are also contemplated, for example verification of the driver component 136 may include verification of one or more encryption keys. The invention is not to be limited in this regard. Protection, in various embodiments, may include the use of protection page tables. This may effectively isolate the execution environment of the sandbox driver 136, but still allow the sandbox driver 136 to communicate with other applications. Other forms of protection are also contemplated.

In various embodiments, with the driver component 136 effectively validated and protected via its isolated execution environment, applications may be registered with the management module 140. In various embodiments, the driver component 136 may register an application 108 that requires various components to be sandboxed with the memory protection module 140. The driver component 136, in various embodiments, may indicate the name of the application and the address space context (e.g., CR3 of Intel Architecture Processor) of the application. In various embodiments, the driver component 136 may identify programs to be sandboxed via the program itself indicating a need for sandboxing, various integrity measurements of the program, or via other methods known in the art for identifying programs such as pluggable code modules. The invention is not to be limited in this regard.

In various embodiments, an application may also find it desirable to register itself for protection. In various embodiments, this may occur when a third party programmer seeks an enhanced protection from pluggable code modules. For example, a security software vendor may wish to protect their software executing in ring-0 from unknown pluggable code modules similarly executing in ring-0. To accomplish this, in various embodiments, an application may be modified to support an extension which may be configured to inform a management module 140 of areas of memory that the program wishes to restrict access. That is, the application may indicate a restricted memory region to be inaccessible by various components. This may allow software vendors to write extensible applications with a high-level of trust (e.g. hardware enforced).

In various embodiments, the driver component 136 may also register restricted memory regions for the OS kernel. In various embodiments, this may be specified by the driver by static configuration or in other embodiments by dynamic discovery of kernel symbols. In various embodiments, the restricted memory regions for the OS kernel may be inaccessible by all sandboxed components. In various other embodiments, as will be discussed in more detail below, various sandboxed components or sandboxed programs may be allowed variable restricted access to various memory regions for the OS kernel.

In various embodiments, with the restricted memory regions specified for various applications 108 and the supervisory component 112 (e.g., OS kernel), the VMM of the computing device may obtain information related to a component of an application executing in a memory region of the computing device allocated to the application. In various embodiments, this may include receiving, from the driver component 136, information associated with a program to be sandboxed to restrict the sandboxed program from accessing one or more restricted regions of a memory space. For example, a program to be sandboxed may be a new driver, a new component, or an application plug-in that is loaded into the address space. In various embodiments, the information may include, for example, the linear address space ranges and the application name. In other embodiments, the VMM may obtain the information by dynamically discovering the new component or application plug-in within an address space based on, for example, page faults experienced within the application/kernel address space after the initial registration of the application/kernel by the driver component 136.

In various embodiments, based on the obtained information, a management module 140 of the computing device may generate a page table and/or one or more page table entries for the program to be sandboxed, e.g. the new driver component or application plug-in. In various embodiments, the one or more page table entries may be configured to allow the component restricted access to the memory region of the application, in other words, with some memory areas inaccessible. In various embodiments, the page table may be a shadow page table for the linear address range where the component (e.g. the new driver or application plug-in) is loaded. This may ensure that the sandboxed component has none, or restricted, access to the restricted linear range for that specific address space (e.g. of the application or OS kernel).

In various embodiments, any access from the sandboxed plug-in and/or driver to the restricted linear address range may be disallowed. In various embodiments, as will be described in more detail below, two application plug-ins executing in the same application space may have different sandboxing restrictions or restriction views. For example, an unknown driver may be configured to access only unrestricted memory due in part to its questionable or unknown origin, e.g. a first restriction view. Another driver executing in the same address space which has undergone an integrity measurement may be granted access to some restricted memory, but not all, e.g. a second restriction view. In this manner, customizable access to various memory regions of the same address space may be enforced.

In various embodiments, violation events may be reported by the VMM or management module 140 to the protected sandboxing driver and/or the protected application. This may allow users to get events on access and allow dynamic control over what a particular program or plug-in is allowed or disallowed to do. This may, for example, enable dynamic control over a browser helper object (BHO).

Figure 2:
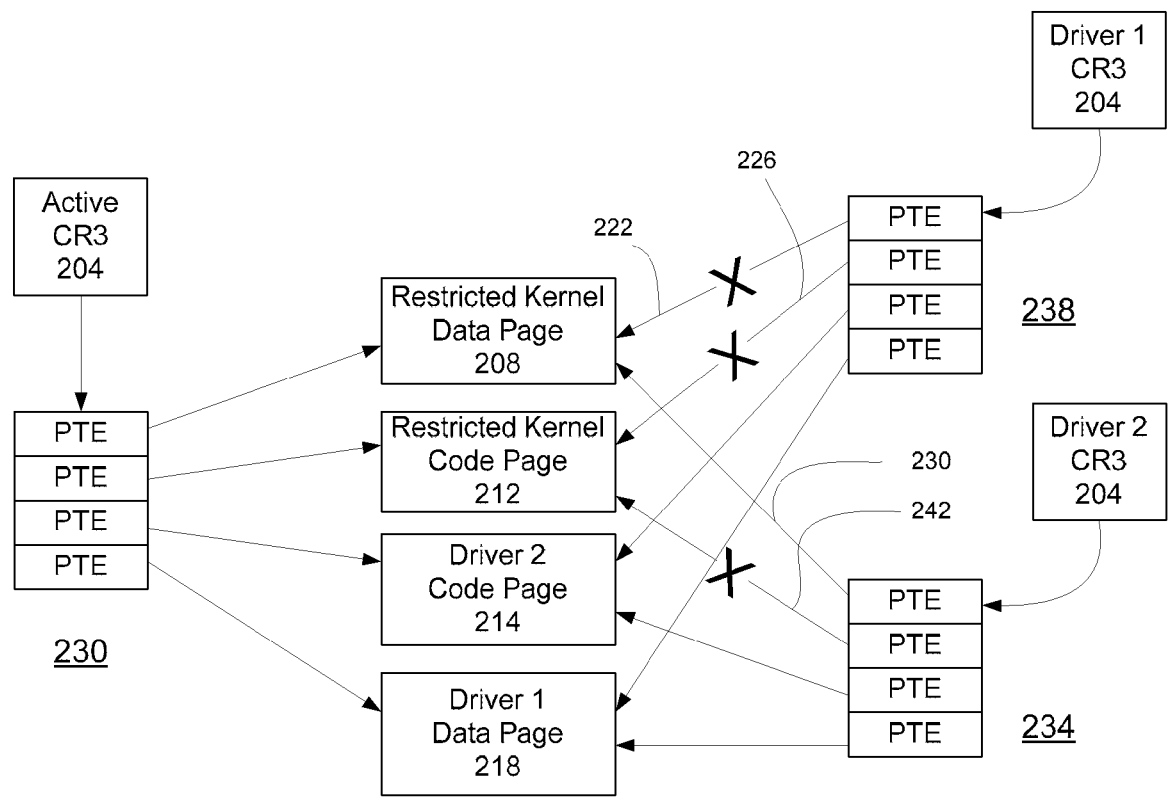
FIG. 2 illustrates page table setups for restricting memory access of various components, in accordance with various embodiments.

Referring to FIG. 2, various page tables for sandboxed components are illustrated in accordance with various embodiments. FIG. 2 includes system memory 208-218, control registers (e.g., CR3 of Intel Architecture Processors) 204, and page tables 230, 234, 238.

In various embodiments, system memory may include multiple pages 208-218. While only four pages are illustrated, it is to be understood that system memory may include more or fewer memory pages. In the illustrated embodiments, system memory includes memory page 208 including restricted kernel data, page 212 including restricted kernel code, page 214 including driver 2 code, and page 218 including driver 1 data. In various embodiments, page tables 230, 234, and 238 may include page table entries and may be generated and maintained by the management module (not illustrated). In various embodiments page table 238 may have been created in response to registration of driver 1. Similarly, page table 234 may have been created in response to registration of driver 2. Page table 230 may correspond to an application and may have been generated upon registration of the application with the management module.

In various embodiments, driver 1 may correspond to an unknown application or plug-in. Therefore, in various embodiments, its restrictions may be set so that driver 1 may only access unrestricted memory regions, such as those of driver 2 code page 214 and driver 1 data page 218. Restricted memory, such as kernel data page 208 and kernel code page 212, are protected from the unknown components. In various embodiments, the page table will be created so that access to such system memory is blocked. That is access attempt 222 and 226 are rejected. In various embodiments, these attempts may be reported to the VMM and/or protected application.

In various embodiments, driver 2 may include driver components that have been measured or otherwise verified as non-malicious. In various embodiments, it may be beneficial to allow measured components such as driver 2, which are inherently more secure, to have access to some restricted memory, but not all. In this embodiment, driver 2 may be exempted and allowed to access 230 an otherwise restricted kernel data page 208, but may be restricted 242 from accessing a restricted kernel code page 212. In this manner, sandboxed plug-ins with varying levels of security may be granted varying access to application space (e.g. given different restrictions or restriction views). This in various embodiments, this may allow trusted drivers or other privileged services running at the same privilege level (e.g., ring-0) to be protected from unknown drivers or components.

Figure 3:
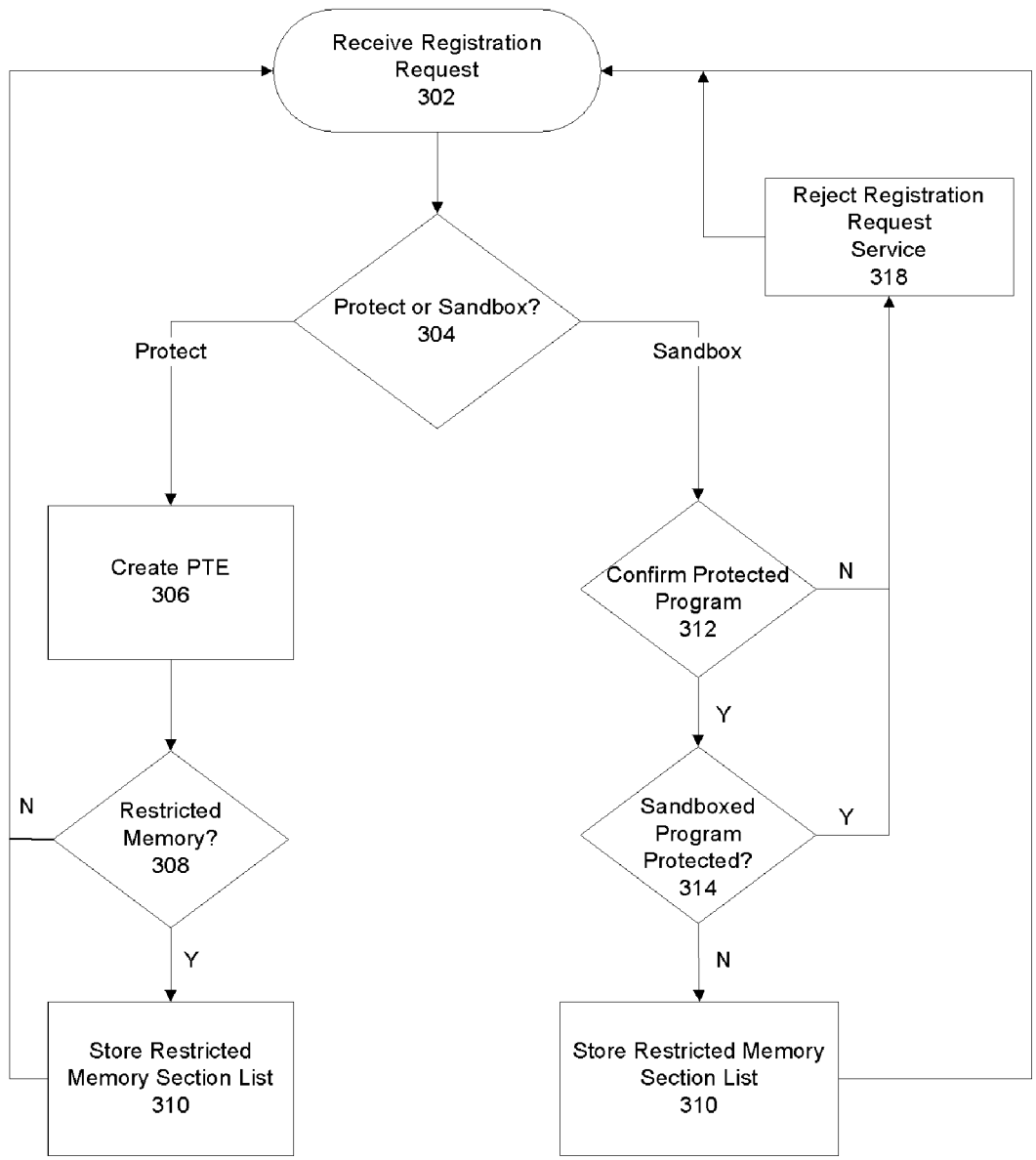
FIG. 3 illustrates a flow diagram in accordance with various embodiments.

Referring to FIG. 3, a flow diagram in accordance with various embodiments is illustrated. The operation may begin at block 302 with the receipt of a registration request, e.g., via a hyper call in the case of an Intel Architecture execution environment. The flow may continue to block 304 where it is to be decided whether the registration request is to protect a program or to sandbox a component.

In various embodiments, assuming the registration request is to protect a program, the process may continue to block 306 where a page table protecting certain memory regions may be created. In various embodiments, the protection page table may be created by giving access to memory areas excluding the protected region. In various embodiments, prior to creating a protection page table, the program may be measured based on a provided manifest included in the PE file. In other embodiments, other manners of verification may be used. Subsequent to measuring or verifying the program and protecting the program with a created page table, the process may continue to block 308 where it is determined if the program has provided information pertaining to any memory regions it wants to prevent access to or protect from unknown plug-ins or programs to be sandboxed. If, at block 308, the program has not provided any such information the process may loop back to block 302 and await the next registration request. If, however, at block 308 a restricted memory region is specified by the program, the process may continue to block 310 where identification or description of the specified restricted memory region is stored in a restricted memory section list. In various embodiments, this may include ensuring the restricted memory regions as provided by the driver or application are part of the program's address space. After storing the restriction information in the restricted memory section list, the flow may continue to block 302 to await the next registration request.

Returning to block 304, if the registration request was for sandboxing an unknown program or component, for example an active-x plug-in, the flow may continue to block 312 where a determination is made regarding whether the application associated with the unknown program is protected. In various embodiments, this may include using a lookup list of protected agents to find the application. If the application is not found, the process may continue to block 318 where the registration request is rejected. If, at block 312, the application is found and confirmed as a protected program, the process may continue to block 314 where it is determined whether the unknown program to be sandboxed is protected. In various embodiments, this confirmation may ensure that the sandboxed region has not been previously registered. If the unknown program to be sandboxed was previously registered, the process may continue to block 318 where the registration request is rejected and subsequently continue to block 302 to await the next registration request. If the unknown program to be sandboxed has not been previously protected or registered at block 314, the flow may continue to block 310 where restriction information within the restricted memory section list may be stored. In various embodiments, the process may lookup the list of restricted memory ranges for the application based on the state when the application was protected and create a sandbox page table for the plug-in with restricted memory regions marked as not present or with restricted permissions as requested in the registration request. The process may then proceed to block 302 and await the next registration request.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:

obtaining, by a memory protection module of a computing device, information related to a component of an application and an address space context within which the application executes on the computing device, wherein the address space context has an associated page table having a plurality of page table entries to provide access to memory pages of the address space context, wherein the application includes a plurality components, at least one of which is a plugged-in component, and wherein the information related to the component and the address space context includes whether there is one or more restrictions associated with accessing the address space context by the component; and generating, by the memory protection module, a particularized address space context page table for the component based at least in part on the information related to the component and the address space context, wherein the particularized address space context page table includes another plurality of page table entries configured to allow the component access to some of the memory pages of the address space context, but prohibit access to other memory pages of the address space context in accordance with the one or more restrictions associated with accessing the address space context by the component, wherein the particularized page table for the component is in addition to a default page table associated with the address space context to facilitate access to the memory pages of the address space context.

2. The method of claim 1, further comprising:
accepting, by the memory protection module, from a driver component of an operating system of the address space context, registration of the application with the memory protection module, wherein the registration includes a name of the application and an identification of the address space context.

3. The method of claim 2, wherein the obtaining comprises dynamically discovering, by the memory protection module, the component based on one or more page faults within the address space context.

4. The method of claim 1, further comprising:
accepting registration from the application, by the memory protection module, wherein the registration includes one or more restricted memory pages of the address space context to be inaccessible to the component.

5. The method of claim 1, further comprising:
accepting, by the memory protection module, registration from a driver component of an operating system of the address space context, wherein the registration includes one or more restricted memory pages of the address space context associated with a kernel of the operating system, and the restricted one or more memory pages to be inaccessible to the component.

6. The method of claim 5, further comprising the driver component dynamically discovering the one or more restricted memory pages of the address space context associated with the kernel of the operating system via one or more kernel symbols of the kernel.

7. The method of claim 5, further comprising:
isolating an execution environment of the driver component from other components of the operating system and applications executing with the address space context.

8. A non-transitory computer-readable storage medium having a plurality of instructions configured to program a computer to implement a memory protection module on the computer, in response to execution of the instructions by the computer, wherein the memory protection module is configured to:
obtain information associated with a program associated with an application and an address space context within which the application executes on the computer, wherein the application includes a plurality of programs, at least one of which is a plugged-in program, and wherein the information associated with the program and the address context space includes whether one or more restrictions associated with accessing the address space context by the program; and
generate in response a particularized page table having a plurality page table entries for the program, wherein the page table entries are configured to allow the program to access some memory pages of the address space context, but restrict the program from accessing other memory pages of the address space context according to the one or more restrictions associated with accessing the address space context by the program, wherein the particularized page table for the program is in addition to a default page table associated with the address space context to facilitate access to the memory pages of the address space context.

9. The storage medium of claim 8, wherein the memory protection module is further configured to:
dynamically discover the program based on one or more page faults within the address space context.

10. The storage medium of claim 8, wherein the memory protection module is further configured to receive a linear address range of the program and a name of the program.

11. The storage medium of claim 8, wherein the memory protection module is further configured to generate the page table entries for a linear address range where the program is to be loaded.

12. The storage medium of claim 8, wherein the memory protection module is further configured to:
accept registration from a driver component of an operating system of the address space context, wherein the registration includes a restricted memory region of the operating system, and wherein the restricted memory region of the operating system is dynamically discovered by the driver component.

13. The storage medium of claim 8, wherein the memory protection module is further configured to:
accept registration from a driver component of an operating system of the address space context, wherein the registration includes a restricted memory region of the operating system, and wherein the restricted memory region of the operating system is specified by a static configuration of the driver component.

14. The storage medium of claim 8, wherein the memory protection module is further configured to:
report a violation event, when the program attempts to access the one or more restricted memory pages of the address space context.

15. A system comprising:
a processor;
memory coupled with the processor;
a memory protection module to be operated by the processor; and
a driver component to be operated by the processor and communicatively coupled with the memory protection module, wherein the driver component is configured to perform a registration operation with the memory protection module wherein the registration operation includes registration of a program associated with an application within an address space context, wherein the application includes a plurality of programs, at least one of which is a plugged-in program, and wherein the registration includes provision of information that includes whether there is one or more restrictions associated with access of the address space context by the program;
wherein the memory protection module is configured to generate a particularized page table with a plurality of page table entries, for the program, in response to the registration, wherein the page table entries are configured to allow the program to access some memory pages of the address space context, and restrict access to other memory pages of the address space context in accordance with whether there is one or more restrictions associated with access of the address space context by the program, and wherein the particularized page table is in addition to a default page table of the address space context.

16. The system of claim 15, wherein the driver component is further configured to indicate a name of the application and an identification of the address space context during performance of the registration operations.

17. The system of claim 16, wherein the particularized page table is further configured to dynamically discover the program based on one or more page faults within the address space context.

18. The system of claim 15, wherein the driver component is further configured to perform registration of a kernel of an operating system of the address space context, wherein registration of the kernel includes registration of a restricted memory region of the address space context associated with the kernel, the restricted memory region to be inaccessible to the program.

19. The system of claim 15, wherein the memory protection module is further configured to generate another particularized page with another plurality of page table entries in response to another registration operation, wherein the another registration operation includes registration of another program associated with the application, wherein the another particularized page table is in addition to the particularized page table and the default page table.

20. The system of claim of claim 19, wherein the plurality of page table entries provide the program with restricted access to the address space context in accordance with a first restriction view of the address space context; and the another plurality of page table entries provide the another program with restricted access to the address space context in accordance with a second restriction view of the address space context, wherein the first restriction view is different from the second restriction view.

* * * * *

UNITED STATES PATENT AND TRADEMARK OFFICE
CERTIFICATE OF CORRECTION

PATENT NO. : 8,381,288 B2
APPLICATION NO. : 12/242716
DATED : February 19, 2013
INVENTOR(S) : Ravi Sahita et al.

Page 1 of 1

It is certified that error appears in the above-identified patent and that said Letters Patent is hereby corrected as shown below:

IN THE CLAIMS:

Column 8
Line 58, "...plurality components,..." should read - ...plurality of components,...

Column 9
Lines 57-58, "...restrictions associate ..." should read - ...restrictions are associated...
Line 61, "plurality page table entries..." should read - plurality of page table entries...

Signed and Sealed this
Fifth Day of April, 2016

Michelle K. Lee
*Director of the United States Patent and Trademark Office*